Jan. 27, 1931.  J. S. MATTHEWS  1,790,105
COTTON TOPPING APPARATUS
Filed Nov. 24, 1928
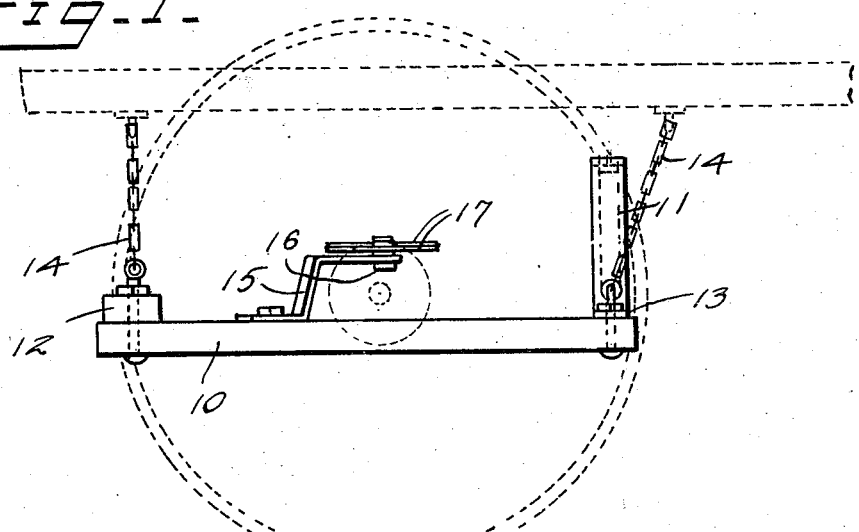
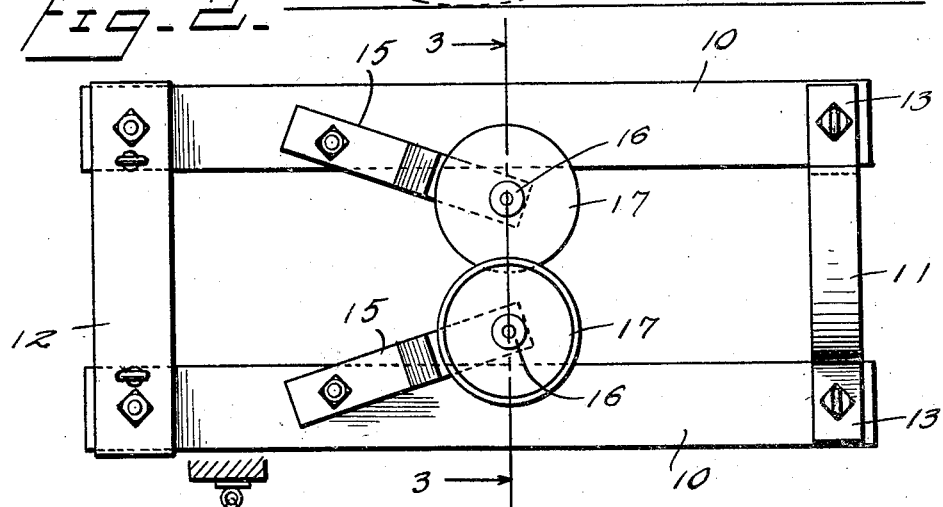
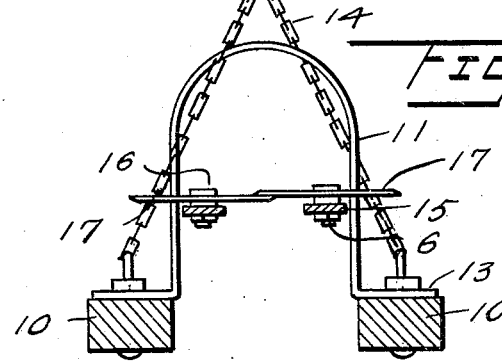
Inventor
J. S. Matthews
By Watson E. Coleman
Attorney Patented Jan. 27, 1931

1,790,105

UNITED STATES PATENT OFFICE

JAMES S. MATTHEWS, OF CLINTON, OKLAHOMA

COTTON-TOPPING APPARATUS

Application filed November 24, 1928. Serial No. 321,653.

This invention relates to cotton topping apparatus and more particularly to a means for removing the tops of cotton plants or similar plants above a predetermined level, thereby preventing rank vertical growth of the plants and causing the same to bush and spread with the result that a heavier yield is produced.

An important object of the invention is to produce an apparatus of this character which may be conveniently made in the form of an attachment for a cultivator, by means of which the plants are being cultivated, and which may be very readily attached to the cultivator.

A still further object of the invention is to provide a device of this character which is adaptable to practically any type of cultivator and which may be adjusted to permit the plants to be cut at any selected level.

These and other objects I attain by the construction shown in the accompanying drawing, wherein for the purpose of illustration is shown a preferred embodiment of my invention and wherein:—

Figure 1 is a side elevation showing a cultivator attachment constructed in accordance with my invention, the method of applying the same to the cultivator being indicated by the illustration of the cultivator in dotted lines:

Figure 2 is a plan view of the attachment;

Figure 3 is a section on the line 3—3 of Figure 2.

Referring now more particularly to the drawing, the attachment comprises a frame including side members 10 and front and cross members 11 and 12. The rear cross member 12 may be simply in the form of a straight bar rigidly connecting the rear ends of the side members while the front cross member 11 is in the form of a U-shaped bar providing an arch or passage for the plants previous to the topping thereof and having at the ends of the arms thereof angular feet 13, which are bolted or otherwise secured to the forward ends of the cross members. At the rear ends of the side members or at any other convenient point upon the rear end of the frame, a pair of flexible elements 14 are connected, the purpose of which will presently appear.

Each side member has secured thereto the inner end of an arm 15, the extremity of which is vertically offset and provided with a vertically extending bearing 16 for a cutting disk 17. These disks overlap and have their edges in shearing relation to one another, so that the plant engaging between the disks at the forward part thereof and pass rearwardly between the disks will be severed thereby at the level at which the disks are disposed.

In the use of the device, the front cross bar is secured to the frame of the cultivator, so that the frame of the attachment extends rearwardly over and between the cultivator gangs. The flexible elements 14 are likewise connected to the frame of the cultivator and are employed to vertically adjust the rear end of the frame until the knives formed by the cutting disks are disposed at the desired level above the ground. The cultivator is then employed in its usual manner, being driven along the row to cultivate the plants and the tops of the plants will be successively passed between the knives to remove excess growth.

It will be obvious that an attachment of this character may be very readily and cheaply manufactured and will provide an efficient and durable means for topping the plants. It will also be obvious that the construction employed may be considerably varied without departing from the spirit of the invention and I accordingly do not limit myself to such specific structure except as hereinafter claimed.

I claim:—

1. A plant topping attachment for cultivators comprising a frame including substantially parallel side members adapted to be connected at their forward ends to the cultivator frame and to afford uninterrupted passage for the plants therebetween, cutting disks having their edges in shearing relation pivotally carried by said side members and engaging plants passing between the side members to remove excess top growth therefrom as the cultivator is moved along a row, and flexible means for supporting the rear end of the frame from the cultivator.

2. A plant topping attachment for cultivators comprising a frame including substantially parallel side members, an arched front member connecting said side members and adapted to be connected to the frame of a cultivator, a pair of adjustable arms carried by said side members and each having at its inner end a cutting disk, said cutting disk being arranged in shearing relation and freely rotatable, and flexible means at the rear end of the frame for holding said side members in properly spaced relation to the cultivator.

3. A plant topping attachment for cultivators comprising a frame including substantially parallel side members, an arched front member connecting said side members and adapted to be connected to the frame of a cultivator, a pair of converging adjustable arms carried by said side members and each having at its inner end a cutting disk, said cutting disk being arranged in shearing relation and freely rotatable, means at the rear end of the frame for holding said side members in properly spaced relation, and flexible elements connected with the rear end of the frame and adapted to be connected to the frame of the cultivator for maintaining the rear end of the frame in horizontal position.

In testimony whereof I hereunto affix my signature.

JAMES S. MATTHEWS.